(12) United States Patent
Suzuki et al.

(10) Patent No.: US 10,370,494 B2
(45) Date of Patent: Aug. 6, 2019

(54) ETHLENEIMINE POLYMER AND METHOD FOR PRODUCING SAME

(71) Applicant: NIPPON SHOKUBAI CO., LTD, Osaka (JP)

(72) Inventors: Seiichi Suzuki, Kanagawa (JP); Taisuke Kasahara, Kanagawa (JP)

(73) Assignee: NIPPON SHOKUBAI CO., LTD, Osaka (JP)

( * ) Notice: Subject to any disclaimer, the term of this patent is extended or adjusted under 35 U.S.C. 154(b) by 0 days.

(21) Appl. No.: 15/519,675

(22) PCT Filed: Oct. 17, 2014

(86) PCT No.: PCT/JP2014/077719
§ 371 (c)(1),
(2) Date: Apr. 17, 2017

(87) PCT Pub. No.: WO2016/059728
PCT Pub. Date: Apr. 21, 2016

(65) Prior Publication Data
US 2017/0247511 A1    Aug. 31, 2017

(51) Int. Cl.
*C08G 73/02* (2006.01)
*C09D 11/03* (2014.01)
*C09D 11/037* (2014.01)
*C09D 11/106* (2014.01)

(52) U.S. Cl.
CPC ..... *C08G 73/0213* (2013.01); *C08G 73/0206* (2013.01); *C09D 11/03* (2013.01); *C09D 11/037* (2013.01); *C09D 11/106* (2013.01)

(58) Field of Classification Search
None
See application file for complete search history.

(56) References Cited

U.S. PATENT DOCUMENTS

| | | | |
|---|---|---|---|
| 3,203,910 A | 8/1965 | Wilson | |
| 2001/0014730 A1 | 8/2001 | Suzuki et al. | |
| 2001/0039318 A1 | 11/2001 | Suzuki et al. | |
| 2014/0163199 A1* | 6/2014 | Hueffer | C08G 73/0213 528/424 |

FOREIGN PATENT DOCUMENTS

| | | |
|---|---|---|
| CN | 104081503 | 10/2014 |
| EP | 1386733 A1 | 4/2004 |
| EP | 2806454 A1 | 11/2014 |
| EP | 303 1842 A1 | 6/2016 |
| JP | 52-010400 A | 1/1977 |
| JP | 2000501757 A | 2/2000 |
| JP | 2001270941 A | 10/2001 |
| JP | 2003137925 A | 5/2003 |
| JP | 2012214597 A | 11/2012 |
| JP | 2013161928 A | 8/2013 |
| JP | 2015034189 A | 9/2016 |
| JP | 2017171933 A | 9/2017 |
| WO | WO2009052835 * | 4/2009 |
| WO | 2013108791 A1 | 7/2013 |

OTHER PUBLICATIONS

Kuge et al., "Gel Permeation Chromatography of Polysaccharides: Universal Calibration Curve," Agric. Biol. Chem. 48(9), 2375-2376, 1984 (Year: 1984).*
International Search Report, PCT/JP2014/077719, dated January 20, 2015.
International Preliminary Report on Patentability, PCT/JP2014/077719, dated Apr. 27, 2017.
Japanese Notice of Reason for Refusal dated May 15, 2018, 2016-553949.
Extended European Search Report dated May 2, 2018.
Chinese First Office Action, dated Jun. 25, 2018.
Japanese Official Notice of Reason for Refusal, dated Dec. 14, 2018.

* cited by examiner

*Primary Examiner* — Pancham Bakshi
*Assistant Examiner* — Mark R Luderer
(74) *Attorney, Agent, or Firm* — Porzio Bromberg & Newman P.C.

(57) ABSTRACT

Provided is an ethyleneimine polymer which exhibits excellent close adhesion properties and adhesive properties and is unlikely to form a gel-like film, and a method for producing the same. An ethyleneimine polymer, wherein a number average molecular weight (Mn) of the ethyleneimine polymer measured by gel permeation chromatography in terms of pullulan is 13,000 or more, a degree of dispersion of the ethyleneimine polymer is greater than 3.0 and 5.0 or less, and a water content in the ethyleneimine polymer is from 3 to 35% by weight.

14 Claims, No Drawings

# ETHYLENEIMINE POLYMER AND METHOD FOR PRODUCING SAME

TECHNICAL FIELD

The present invention relates to an ethyleneimine polymer and a method for producing the same. More particularly, the present invention relates to a method for producing an ethyleneimine polymer, in which ethyleneimine is subjected to a ring-opening polymerization, and an ethyleneimine polymer.

BACKGROUND ART

Hitherto, ethyleneimine polymers have been widely utilized in the fields of paper processing agents, adhesives, pressure sensitive adhesives, paints, inks, textile treatment agents, coagulative separating agents, cosmetics, toiletries, dispersing agents, and the like. However, it is difficult to conduct the polymerization of ethyleneimine while controlling the polymerization temperature, the molecular weight, the branch structure, and the like since ethyleneimine is highly reactive, and thus various methods for polymerizing ethyleneimine have been proposed.

A method for producing an aqueous solution of an ethyleneimine polymer having a concentration of from 25 to 50% and a high molecular weight is disclosed in Patent Literature 1, Patent Literature 2, and Patent Literature 3. Specifically, a method for producing an aqueous solution of an ethyleneimine polymer is proposed in which ethyleneimine is polymerized in the presence of water and a catalyst such as a polyhalogenated compound represented by 1,2-dichloroethane.

The aqueous solution of an ethyleneimine polymer thus obtained is the aqueous solution of an ethyleneimine polymer which has the highest molecular weight in the current industrial level. Specifically, the number average molecular weight (hereinafter, abbreviated as Mn) of the ethyleneimine polymer measured by gel permeation chromatography (hereinafter, also referred to as "GPC") in terms of pullulan of the molecular weight standard substance is 10,000 or more.

The ethyleneimine polymer obtained by the above method does not exhibit sufficient adhesive properties compared to the used amount in the case of being used in an application such as an adhesive, and thus it is desired to develop an ethyleneimine polymer which can secure sufficient adhesive properties when used in a smaller amount.

Meanwhile, an increase in additional amount of ethyleneimine slows down and the reaction takes a long time as the ethyleneimine polymer has a higher molecular weight. Hence, the production of polyethyleneimine having a high molecular weight has a problem that it has a poor productivity and it is significantly disadvantageous on an industrial scale.

Furthermore, a phenomenon that a gel-like film is likely to be formed on the surface of ethyleneimine polymer along with the passage of time is observed depending on the ethyleneimine polymers to be obtained as it has a higher molecular weight. This film affects the deterioration in adhesive properties and the like in a case in which the film is mixed into the ethyleneimine polymer and this ethyleneimine polymer is used in applications such as an adhesive. Hence, there is an adverse effect on using that, for example, the surface film is required to be removed before using the ethyleneimine polymer.

CITATION LIST

Patent Literatures

Patent Literature 1: JP 43-8828 B
Patent Literature 2: JP 2001-213959 A
Patent Literature 3: JP 2001-288265 A

SUMMARY OF INVENTION

Technical Problem

The invention provides an ethyleneimine polymer which exhibits excellent close adhesion properties and adhesive properties and is unlikely to form a gel-like film, and a method for producing the same.

Solution to Problem

The present inventors considered that the factor to inhibit the close adhesion properties and the adhesive properties is that the low molecular weight component is contained in the ethyleneimine polymer to be obtained in a significant amount due to the broad molecular weight distribution thereof (degree of dispersion (Mw/Mn), which is a value obtained by dividing the weight average molecular weight by the number average molecular weight) (degree of dispersion ≥10). In addition, the present inventors investigated on the kind of catalyst, the water content, the method for adding the monomer or the catalyst, and the like in the belief that the cause of a low molecular weight and a broad molecular weight distribution is that the polymerization is conducted under a condition containing a great amount of water and a polyhalogenated compound catalyst and the fact that it is difficult to control the polymerization when water is contained in a small amount is an obstacle to conduct the polymerization (namely, slowing down of an increase in additional amount of ethyleneimine). As a result, it has been found out that an ethyleneimine polymer which has both a high number average molecular weight and a narrow molecular weight distribution is obtained unlike the method of the prior art and the productivity can be improved to such a degree that the ethyleneimine polymer is industrially feasible. Moreover, it has been confirmed that according to the ethyleneimine polymer which is obtained in this manner and has the above physical properties, sufficient adhesive properties can be secured with a smaller amount of the ethyleneimine polymer in the case of being used in an application such as an adhesive.

Meanwhile, with regard to the formation of surface film, it is believed that the formation of surface film is suppressed as an appropriate amount of a low molecular weight ethyleneimine polymer is present in the high molecular weight ethyleneimine polymer since the surface film is more likely to be formed as the ethyleneimine polymer has a higher molecular weight. In addition, the present inventors have investigated on the appropriate water content to suppress the reaction of the ethyleneimine polymer with the carbon dioxide gas in the belief that the film formation is caused by the reaction of the ethyleneimine polymer with the carbon dioxide gas in the air since the surface film is more likely to be formed as the temperature load is higher and the contact degree with the air is higher. As a result, an ethyleneimine polymer which has a high molecular weight and in which the formation of surface film is suppressed has been found out unlike the method of the prior art, thereby completing the invention.

That is, according to an aspect of the invention, there is provided an ethyleneimine polymer, wherein a number average molecular weight (Mn) of the ethyleneimine polymer measured by gel permeation chromatography in terms of pullulan is 13,000 or more, a degree of dispersion of the ethyleneimine polymer is greater than 3.0 and 5.0 or less, and a water content in the ethyleneimine polymer is from 3 to 35% by weight.

According to another aspect of the invention, there is provided a method for producing an ethyleneimine polymer, the method comprising: polymerizing ethyleneimine under a temperature condition of higher than 90° C. and 150° C. or lower in the presence of water at from 1.0 to 40% by mass with respect to 100% by mass of the ethyleneimine and a catalyst at from 0.3 to 5% by mass with respect to 100% by mass of the ethyleneimine.

Effect of Invention

According to the present invention, an ethyleneimine polymer which exhibits excellent close adhesion properties and adhesive properties and is unlikely to form a gel-like film, can be provided.

DESCRIPTION OF EMBODIMENTS

An aspect of the invention is an ethyleneimine polymer, wherein a number average molecular weight (Mn) of the ethyleneimine polymer measured by gel permeation chromatography in terms of pullulan is 13,000 or more, a degree of dispersion of the ethyleneimine polymer is greater than 3.0 and 5.0 or less, and a water content in the ethyleneimine polymer is from 3 to 35% by weight.

By having such a configuration, an ethyleneimine polymer which exhibits excellent close adhesion properties and adhesive properties and in which the formation of surface film is suppressed is obtained.

The reason for that the ethyleneimine polymer of the invention exhibits excellent close adhesion properties and adhesive properties and in which the formation of surface film is suppressed is believed as follows.

Ethyleneimine polymers have an amino group in the structure thereof, and the amino group forms a hydrogen bond with a hydroxyl group, an ionic bond with a carboxyl group, and a covalent bond with a carbonyl group. In addition, the ethyleneimine polymers have a polar group (amino group) and a hydrophobic group (ethylene group) in the structure and thus bond with different materials. It is believed that in the ethyleneimine polymer obtained by the invention, the close adhesion properties and adhesive properties are maintained by setting the average molecular weight to be equal as compared with the product of the prior art, namely, by narrowing the molecular weight distribution, and also the formation of surface film is suppressed by slightly broadening the molecular weight distribution to such a degree not affecting the close adhesion properties and adhesive properties, namely, by appropriately increasing the ratio of a low molecular weight ethyleneimine polymer.

In addition, it is believed that the reaction of polyethyleneimine with carbon dioxide gas in the air is suppressed as an appropriate amount of water is present near the surface, and as a result, the formation of surface film is suppressed.

Incidentally, the mechanism described above is based on presumption, and the invention is not limited to the mechanism in any way.

Hereinafter, preferred embodiments of the invention will be described. Incidentally, the invention is not limited to the following embodiments.

In addition, in the present specification, the term "X to Y" to indicate the range means "X or more and Y or less", the term "weight" and the term "mass" are regarded as synonymous with each other. In addition, the operations and the measurement of physical properties and the like are conducted under a condition of room temperature (20 to 25° C.)/relative humidity of from 40 to 50% unless otherwise stated.

<Ethyleneimine Polymer>

An ethyleneimine polymer is a water-soluble polymer obtained by polymerizing ethyleneimine and a polymer compound having a branched structure containing a primary amine, a secondary amine, and a tertiary amine. The ethyleneimine polymer is highly reactive as compared to other polymer compounds, and it is subjected to a reaction with an aldehyde compound, an alkyl halide compound, an isocyanate compound, an epoxy compound such as epichlorohydrin, a cyanamide compound, a guanidine compound, urea, a carboxylic acid compound, a cyclic acid anhydride compound, and an acyl halide compound so as to be used as chemically modified ones depending on the application.

The ethyleneimine polymer in the invention has a high number average molecular weight and narrow molecular weight distribution; however, the surface film is likely to be formed although high close adhesion properties and high adhesive properties are exhibited as the molecular weight distribution is narrower, namely, the degree of dispersion is smaller. Thus, an appropriate balance between the number average molecular weight and the molecular weight distribution is required in order to achieve both the high close adhesion properties and high adhesive properties and the suppression of surface film. Specifically, the number average molecular weight (Mn) is 13,000 or more, preferably 19,000 or more, and more preferably 25,000 or more. It is difficult to obtain sufficient close adhesion properties and adhesive properties in the case of using the ethyleneimine polymer in an adhesion promoter and the like when the number average molecular weight thereof is less than 13,000. In addition, the number average molecular weight is preferably 50,000 or less, more preferably 45,000 or less, and further more preferably 40,000 or less. It is preferable that the number average molecular weight is 50,000 or less since uniform stirring can be conducted at the time of the polymerization without requiring an excessive stirring power.

The degree of dispersion is greater than 3.0 and 5.0 or less, preferably greater than 3.0 and 4.5 or less, and more preferably from 3.1 to 4.0. It is not preferable that the degree of dispersion is 3.0 or less since the surface film is likely to be formed, and it is not preferable that the degree of dispersion exceeds 5.0 since the low molecular weight component to be the cause of deterioration in adhesive properties increases.

The concentration of water (referred to as the water content in some cases) in the ethyleneimine polymer of the invention is from 3 to 35% by mass, preferably from 4 to 20% by mass, and more preferably from 5 to 10% by mass. It is not preferable that the water concentration (water content) is less than 3% by mass since the surface film is likely to be formed, and it is not preferable that the water concentration (water content) exceeds 35% by mass since it is difficult to sufficiently exert the effect when the ethyleneimine polymer is used in various applications or other problems arise in some cases so that the application on usage is limited.

The weight average molecular weight and the number average molecular weight in the invention can be measured by a known method in which the pullulan is used as a standard substance and gel permeation chromatography (GPC) is adopted. The following conditions are adopted as the measurement conditions for GPC in the invention.
Measuring device; manufactured by Shimadzu Corporation
Column used; Shodex Asahipac GF-710HQ+GF-510HQ+GF-310HQ manufactured by SHOWA DENKO K.K.
Eluent; one prepared by adding acetic acid to 0.2 mol % aqueous solution of monoethanolamine and adjusting the pH to 5.1
Standard substance; pullulan P-82 (manufactured by Wako Pure Chemical Industries, Ltd.)
Detector; differential refractometer (manufactured by Shimadzu Corporation)

The method for producing an ethyleneimine polymer according to the invention is not particularly limited, but according to another aspect of the invention, a method for producing an ethyleneimine polymer, the method comprising: polymerizing ethyleneimine under a temperature condition of higher than 90° C. and 150° C. or lower in the presence of water at from 1.0 to 40% by mass with respect to 100% by mass of the ethyleneimine and a catalyst at from 0.3 to 5% by mass with respect to 100% by mass of the ethyleneimine is provided. According to such a method, dehydration is easy and an ethyleneimine polymer having a water content of from 3 to 35% by mass according to the present application can be obtained, and thus it is advantageous for commercialization. Hereinafter, a preferred embodiment of the producing method according to the present aspect will be described.

[Ethyleneimine]

Ethyleneimine which is used in the producing method of the present aspect is not particularly limited, and examples of the synthetic method thereof may include a method in which halogenated ethylamine is subjected to intramolecular ring closure by concentrated alkali in a liquid phase, a method in which monoethanolamine sulfate ester is subjected to intramolecular ring closure by hot concentrated alkali (hereinafter, also referred to as the liquid phase method), or a method in which monoethanolamine is subjected to the catalytic gas phase intramolecular dehydration reaction (hereinafter, also referred to as the vapor phase method).

As ethyleneimine obtained by the vapor phase method, crude ethyleneimine recovered by subjecting an ethyleneimine-containing reaction mixture obtained by the gas phase method from monoethanolamine to a simple distillation operation can be used as a raw material for polymerization (JP 2001-213958 A). Incidentally, in the case of polymerizing crude ethyleneimine, for example as described in JP 2001-261820 A, it is possible to obtain a high-purity ethyleneimine polymer that meets the industrially required quality standards by subjecting the ethyleneimine polymer (hereinafter, referred to as the crude ethyleneimine polymer in some cases) to a simple purification operation.

It is also possible to utilize purified ethyleneimine obtained by highly purifying the ethyleneimine-containing reaction mixture as a raw material for the ethyleneimine polymer synthesis. In this case, the ethyleneimine-containing reaction mixture contains various heavy impurities and light impurities. The heavy impurities include unreacted monoethanolamine; an oligomer of ethyleneimine, a ketone such as acetaldehyde; and the Schif base produced by the reaction of acetaldehyde with monoethanolamine of the raw material. Further, the light impurities include light amines including ammonia, methylamine, and ethylamine and acetonitrile. Purified ethyleneimine obtained by removing these impurities through a high purification process is subjected to the polymerization reaction.

The technique to produce an ethyleneimine polymer using purified ethyleneimine obtained through a high purification process cannot avoid an increase in production cost associated with the implementation of a high purification process, it cannot be said that the technique is industrially advantageous. Thus, crude ethyleneimine is preferably used as the ethyleneimine raw material.

[Catalyst]

The catalyst is not particularly limited, and it is possible to use those commonly used in the polymerization of ethyleneimine, and for example, it is possible to use a mineral acid containing halogen, such as hydrochloric acid or hydrobromic acid, a Lewis acid such as phosphoric acid, carbon dioxide, an organic acid, or boron trifluoride, an organic halogen compound such as chloromethane or bromomethane, and a mono-halogenated alcohol compound such as 2-chloroethanol, 3-chloro-1-propanol, 3-chloro-2-propanol, 3-chloro-1,2-propanediol, 3-chlorobenzyl alcohol, 3-chloro-2,2-dimethyl-1-propanol, 2-(2-chloroethoxy)ethanol, 2-bromoethanol, 3-bromo-1-propanol, 3-bromo-2-propanol, or 3-bromo-1,2-propanediol, and two or more kinds thereof may be concurrently used.

Among these, a water-soluble organic compound having at least one halogen element and a hydrophilic substituent or a water-soluble inorganic acid containing at least one halogen element is preferable as the catalyst.

In a case where the catalyst is soluble in water, the catalyst is easily incorporated into the reaction system containing ethyleneimine and water and thus an ethyleneimine polymer having a high molecular weight is likely to be obtained. In addition, a mono-halide is preferable from the viewpoint of preventing the crosslinkage due to the catalyst. In particular, a water-soluble mono-halogenated organic compound that is poorly volatile (having a high boiling point) is preferable from the viewpoint of handling or safety. As the water-soluble mono-halogenated organic compound, a mono-halogenated alcohol is preferable since it is liquid and close to neutral, and a mono-chloro alcohol is more preferable from the viewpoint of the reactivity or the molecular weight or degree of dispersion of the ethyleneimine polymer to be obtained.

As the mono-chloro alcohol, from the viewpoint of solubility in water, those which have 4 or less carbon atoms/polar groups is preferable, those which have 3 or less carbon atoms/polar groups is more preferable, and those which have 2 or less carbon atoms/polar groups is even more preferable. As specific compounds, 2-chloroethanol, 3-chloro-1-propanol, and 2-chloroethoxyethanol are preferable. Among these, 2-chloroethanol is most preferable.

As the inorganic acid which contains one halogen atom, an inorganic acid containing chlorine is preferable. The inorganic acid which contains chlorine is not particularly limited, but examples thereof may include a chlorine oxyacid such as hypochlorous acid, chlorous acid, hydrochloric acid, or perchloric acid, a chloro acid such as chlorocarbonic acid, chlorosulfuric acid, or chlorosulfurous acid, and hydrochloric acid, and hydrochloric acid is preferable among these.

The lower limit of the amount of the catalyst added is 0.3% by mass or more and preferably 0.5% by mass or more with respect to 100% by mass of the ethyleneimine. It is not preferable that the amount of the catalyst added is less than 0.3% by mass since a sufficient polymerization reaction rate is not obtained. In addition, the upper limit of the amount of the catalyst added is 5% by mass or less, preferably 3% by mass or less, and even more preferably less than 2% by mass. It is not preferable that the amount of the catalyst added exceeds 5% by mass since a sufficiently high molecular weight is not obtained.

[Water]

The lower limit of the amount of water added is 1.0% by mass or more and preferably 5.0% by mass or more with respect to 100% by mass of the ethyleneimine. It is not preferable that the amount of water added is less than 1% by mass since a rapid polymerization reaction is likely to take place and it is difficult to control the polymerization reaction and also the surface film is likely to be formed on the ethyleneimine polymer to be obtained. In addition, the upper limit of the amount of water added is 40% by mass or less and preferably 20% by mass or less. It is not preferable that the amount of water added exceeds 40% by mass since not only the ethyleneimine polymer of the invention is not obtained but also the energy required for removing water enormously increases, which leads to an increase in cost of the product.

[Methods for Adding Catalyst, Water, and Ethyleneimine]

The method for adding the catalyst is not particularly limited, but it is possible to use any of the following three methods as an example.

(Collective Addition)

It is a method in which predetermined amounts of water and the catalyst are charged into the react ion vessel in advance and ethyleneimine is added to this at a predetermined temperature.

(Continuous Addition)

It is a method in which a predetermined amount of water is charged into the reaction vessel and ethyleneimine and the catalyst are continuously added to this at a predetermined temperature. Incidentally, it is preferable to start the addition of the catalyst earlier than the addition of ethyleneimine by about 15 minutes when the continuous addition is adopted in order to prevent that the monomer is present in an excessive amount and thus the reaction rapidly proceeds.

(Intermittent Addition)

It is a method in which a predetermined amount of water is charged into the reaction vessel and the catalyst is intermittently added to this several times as well as ethyleneimine is continuously added to this at a predetermined temperature.

It is possible to obtain the ethyleneimine polymer according to the invention by using any of the three methods described above, but the continuous addition is even more preferable among the above three methods, the intermittent addition is more preferable, and the collective addition is preferable from the viewpoint of obtaining a higher molecular weight.

The rate of ethyleneimine added is determined in consideration of the reaction rate and the capacity or heat removal capability of the polymerization apparatus in any of the three catalyst adding methods described above from the viewpoint of suppressing a rapid reaction and controlling the reaction. In general, the catalyst is continuously added at an addition rate such that the addition is completed preferably in from 0.5 to 20 hours and more preferably in from 4 to 10 hours.

Incidentally, it is also possible to change the addition rate during the polymerization in order to control the polymerization temperature in the continuous addition and the intermittent addition.

In addition, it is preferable to conduct the addition while stirring the mixture using a stirring blade or the like in order to control the polymerization temperature at the time of the addition.

[Reaction Condition]

In the invention, the lower limit of the reaction solution temperature at the time of polymerizing ethyleneimine is 90° C. or higher and preferably 100° C. or higher. In a case in which the temperature of reaction solution is lower than 90° C., the degree of dispersion of the polymer to be obtained decreases and the surface film is likely to be formed. In addition, the upper limit of the reaction solution temperature is 150° C. or lower and preferably 130° C. or lower. When the temperature of reaction solution exceeds 150° C., it is difficult to obtain an ethyleneimine polymer having a high molecular weight.

In the invention, a heat medium such as warm water, water vapor, or heated oil may be used if necessary in order to remove the reaction heat. The upper limit of the temperature of the heat medium is not particularly limited, and it may be a heat medium temperature that is lower than the reaction solution temperature and can control the reaction temperature.

By maintaining the temperature of the heat medium, the reaction solution is prevented from being highly viscous locally during the reaction of ethyleneimine, it is possible to conduct uniform polymerization without local retention by highly efficient stirring, and thus it is possible to conduct the reaction of ethyleneimine uniformly and efficiently.

The aging in the invention refers to the polymerization after the polymerization of ethyleneimine is finished and preferably after 95% or more of ethyleneimine supplied is consumed, the reaction mixture is aged at from 50 to 150° C. and preferably from 70 to 100° C. It is possible to conduct the aging efficiently when it is 50° C. or higher. In addition, it is possible to prevent thermal decomposition of the ethyleneimine polymer produced and to obtain a high-quality polymer when it is 150° C. or lower. The aging time is usually from 0.5 to 20 hours and preferably from 1 to 10 hours.

In the invention, the polymerization of ethyleneimine is conducted in an inert gas atmosphere having an oxygen concentration of preferably 2% by volume or less, more preferably 1% by volume or less, and even more preferably 0.5% by volume or less. It is possible to suppress coloration of the ethyleneimine polymer and to suppress coloration of the ethyleneimine polymer during preservation or storage when the oxygen concentration is 2% by volume or less. The inert gas is not particularly limited, but for example, nitrogen, helium, or argon can be used, and nitrogen is suitably used.

The pressure at the time of the polymerization may be any of normal pressure, reduced pressure, increased pressure, and the polymerization is usually conducted at from 0 to 10 MPaG and preferably from 0 to 2 MPaG. The aging of the reaction mixture is usually conducted at from 0 to 0 MPaG and preferably from 0 to 2 MPaG. Here, MPaG (megapascal gauge) refers to the gauge pressure.

The reactor used for the polymerization reaction and the aging treatment is not particularly limited, but those which are equipped with a stirrer for heat removal, diffusion, and reaction promotion since the viscosity increases during the polymerization and a thermometer and a cooling device for controlling the reaction are generally used.

The purification of the ethyleneimine polymer after the reaction can be conducted, for example, by the method such as bubbling of an inert gas described in JP 2013-71967 A.

The method for adjusting the water content in the ethyleneimine polymer of the invention to from 3 to 35% by mass is not particularly limited, and it is not required to especially conduct a separate step of adjusting the water content in a case in which the water content in the solution obtained by the polymerization is a value within the above range. Meanwhile, one embodiment of the production method according to the invention further includes a step of adjusting the water content after polymerization. The specific means for adjusting the water content in the step of adjusting the water content is not particularly limited, and for example, the adjustment of water content can be conducted by adding water (water content increases) to the ethyleneimine polymer obtained through the polymerization reaction of ethylene imine and aging or by removing water (water content decreases) from the ethyleneimine polymer through distillation or the like. For example, as the method for removing water of the aqueous solution of ethyleneimine polymer, it is possible to easily decrease the water content by heating the aqueous solution of ethyleneimine polymer at a temperature equal to or higher than the boiling point of water. In addition, it is possible to further easily remove water by combining the dehydration under reduced pressure, the concurrent use of a carrier gas such as nitrogen, the concurrent use of an azeotrope of water with a solvent, and the like.

The ethyleneimine polymer according to the invention and modified products thereof can be industrially widely used in applications such as a papermaking agent, a laminate anchor agent of paper, cloth, OPP, and PET films, a heavy metal chelating agent, an additive for metal plating, a foam fire extinguishing agent, improvement in close adhesion properties of a vinyl chloride-based adhesive, a crosslinking agent of an epoxy resin, improvement in close adhesion properties of an ethylene vinyl acetate copolymer (EVA), polyvinyl acetate (PVAc), and polyvinyl alcohol (PVA), improvement in close adhesion properties of, modification of a pressure sensitive adhesive, an adhesion promoter for film printing ink, improvement in close adhesion properties of a paint, a dispersing agent of a pigment and the like, an enzyme immobilizing agent, cement for petroleum mining, water treatment (coagulant), a scale inhibitor, surface modification of glass and carbon fibers, a dye fixing agent, a detergent for textile and tableware, a metal corrosion inhibitor, a wood preservative, hair care products, an adsorbent of carbon dioxide, chlorine, nitrogen oxides, sulfur oxides, hydrogen sulfide, and aldehydes, an antislipping agent for polyvinyl acetal-based film, improvement in heat resistance and oil resistance of thermoplastic polymers such as polyamide, polyacetal, polyolefin, polyester, PVC, and polycarbonate, an anti-static agent of polyolefin, a cross-linking agent of a polymer containing a cyclic acid anhydride group, and a surface modifier of a water absorbent resin.

A preferred application is an adhesion promoter for film printing ink among them. Specifically, the adhesive properties to the film are improved when the ethyleneimine polymer of the invention is blended into the ink composition containing polyvinyl butyral as a binder.

EXAMPLES

Hereinafter, the invention will be specifically described with reference to Examples, but the invention is not limited thereto.

Example 1

Into a reactor that was equipped with a thermometer, a reflux condenser, and a stirrer and had a capacity of 0.5 L, 18.5 g of water and 7.03 g of 2-chloroethanol were charged and heated. After the temperature reached 100° C., the addition of ethyleneimine was started, and 370 g of ethyleneimine was finally added thereto over 8 hours while maintaining the temperature at 110° C. The resultant was aged for 1 hour at 110° C. after the addition of ethyleneimine was finished, thereby obtaining an ethyleneimine polymer. The molecular weight thereof was measured by GPC, and the result was Mn: 19320 and Mw/Mn: 3.1.

Example 2

An ethyleneimine polymer was obtained in the same manner as in the Example 1 except that the final polymerization temperature was set to 120° C. The molecular weight thereof was measured by GPC, and the result was Mn: 17800 and Mw/Mn: 3.3.

Example 3

Into a reactor that was equipped with a thermometer, a reflux condenser, and a stirrer and had a capacity of 0.5 L, 18.5 g of water and 4.87 g of 38% hydrochloric acid were charged and heated. After the temperature reached 100° C., the addition of ethyleneimine was started, and 370 g of ethyleneimine was finally added thereto over 8 hours while maintaining the temperature at 120° C. The resultant was aged for 1 hour at 110° C. after the addition of ethyleneimine was finished, thereby obtaining an ethyleneimine polymer. The molecular weight thereof was measured by GPC, and the result was Mn: 17050 and Mw/Mn: 3.1.

Example 4

Into a reactor that was equipped with a thermometer, a reflux condenser, and a stirrer and had a capacity of 200 L, 98 g of water was charged and heated. After the temperature reached 100° C., 28 g of 2-chloroethanol and 1274 g of ethyleneimine were respectively added thereto over 12 hours while maintaining the temperature of the reaction mixture at 100° C. The resultant was aged for 1 hour at 100° C. after addition of a solution (or composition) of ethyleneimine was finished, thereby obtaining an ethyleneimine polymer. The molecular weight thereof was measured by GPC, and the result was Mn: 13969 and Mw/Mn: 3.4.

Comparative Example 1

An ethyleneimine polymer was obtained in the same manner as in the Example 1 except that the polymerization temperature was changed to 90° C. The molecular weight thereof was measured by GPC, and the result was Mn: 17494 and Mw/Mn: 2.6.

Comparative Example 2

An ethyleneimine polymer was obtained in the same manner as in the Example 3 except that the polymerization temperature was changed to 90° C. The molecular weight thereof was measured by GPC, and the result was Mn: 16621 and Mw/Mn: 2.0.

Comparative Example 3

Into a reactor that was equipped with a thermometer, a reflux condenser, and a stirrer and had a capacity of 0.5 L, 18.5 g of water was charged and heated. After the temperature reached 90° C., 7.03 g of sulfuric acid and 370 g of ethyleneimine were respectively added thereto over 8 hours while maintaining the temperature of the reaction mixture at 90° C. The resultant was aged for 1 hour at 90° C. after the addition of a solution (or composition) of ethyleneimine, thereby obtaining an ethyleneimine polymer. The molecular weight thereof was measured by GPC, and the result was Mn: 6300 and Mw/Mn: 1.5.

(Example 5) Evaluation of Surface Film

The water content in each of the ethyleneimine polymers obtained in Examples 1, 2, and 4 and Comparative Example 1 was adjusted to 3% by mass, 5% by mass, and 10% by mass, 5 g (weight including water) of each of the ethyleneimine polymers was charged into a tube bottle with lid, air tightly closed, and heated for 5 hours at 80° C. in a thermostatic chamber, and the formation of surface film was observed. The results are presented in the following Table 1. Incidentally, in the Examples and Comparative Examples, the water content after synthesis was all 5% by mass, and thus the product having a water content of 3% by mass was prepared through concentration by evaporating water through distillation. Meanwhile, the product having a water content of 10% by mass was prepared through dilution by adding water.

TABLE 1

| Ethyleneimine polymer | Mn | Mw/Mn | Water content (% by mass) | Formation of film |
|---|---|---|---|---|
| Example 1 | 19320 | 3.1 | 3 | Without film |
| Example 1 | 19320 | 3.1 | 5 | Without film |
| Example 1 | 19320 | 3.1 | 10 | Without film |
| Example 2 | 17800 | 3.3 | 3 | Without film |
| Example 2 | 17800 | 3.3 | 5 | Without film |
| Example 2 | 17800 | 3.3 | 10 | Without film |
| Example 4 | 13969 | 3.4 | 3 | Without film |
| Example 4 | 13969 | 3.4 | 5 | Without film |
| Example 4 | 13969 | 3.4 | 10 | Without film |
| Comparative Example 1 | 17494 | 2.6 | 3 | With film |
| Comparative Example 1 | 17494 | 2.6 | 5 | With film |
| Comparative Example 1 | 17494 | 2.6 | 10 | With film |

From Table 1, the formation of film is suppressed in Example 1, Example 2, and Example 4 according to the invention as compared to Comparative Example 1.

(Example 6) Evaluation of Application (Adhesion Promoter for Ink)

In 59 g of ethanol, 10 g of polyvinyl butyral and 1 g of each ethyleneimine polymer were dissolved, and 30 g of titanium oxide as a pigment was mixed therewith, thereby preparing an ink. The ink was coated on an oriented polypropylene film (OPP film) in a thickness of 22.9 µm and dried under a condition of 90° C. and 5 minutes. Next, the adhesive properties of the ink were evaluated by the following two methods. The results are shown in the following Table 2.

(1) The peeling state of the ink when cellophane tape is stuck on the coating film and then peeled off therefrom at an angle of 90° was visually observed (90° peel test).

(2) The peeling state of the ink when the printed film was finely folded and then unfolded was visually observed (folding peel test).

TABLE 2

| Adhesion promoter (ethyleneimine polymer) | Mn | Mw/Mn | 90° peel test | Folding peel test |
|---|---|---|---|---|
| Example 1 | 19320 | 3.1 | Not peeled off | Not peeled off |
| Example 4 | 13969 | 3.4 | Not peeled off | Not peeled off |
| Nil | — | — | Significantly peeled off | Significantly peeled off |
| Comparative Example 3 | 6300 | 1.5 | Slightly peeled off | Significantly peeled off |

From Table 2, peeling off of the ink was not observed in both of the 90° peel test and the folding peel test in Example 1 and Example 4 according to the invention.

On the other hand, peeling off of the ink was significant in both tests in the sample which did not contain an adhesion promoter. In addition, peeling off of the ink was observed in Comparative Example 3, and significant peeling off of the ink was observed particularly in the folding peel test to the same degree as in the case of not containing an adhesion promoter. From this fact, it can be seen that the adhesive properties are inferior in a case in which the molecular weight of the ethyleneimine polymer is not sufficient even when the degree of dispersion thereof is small. From the results above, it is understood that the ethyleneimine polymer according to the invention of the present application exhibits high close adhesion properties as an adhesion promoter for ink.

In addition, the water content, polymerization temperature, and addition time of ethyleneimine when the polymerization reaction was conducted were presented in the following Table 3 together with the results for the number average molecular weight (Mn) and the degree of dispersion (Mw/Mn) for the respective Examples and Comparative Examples.

TABLE 3

| No. | Catalyst | Water content at the time of reaction (wt. %) | Polymerization temperature (° C.) | Addition time of ethyleneimine (hr) | Mn | Mw/Mn |
|---|---|---|---|---|---|---|
| Example 1 | 2-chloroethanol | 5 | 110 | 8 | 19320 | 3.1 |
| Example 2 | 2-chloroethanol | 5 | 120 | 8 | 17800 | 3.3 |

TABLE 3-continued

| No. | Catalyst | Water content at the time of reaction (wt. %) | Polymerization temperature (° C.) | Addition time of ethyleneimine (hr) | Mn | Mw/Mn |
|---|---|---|---|---|---|---|
| Example 3 | Hydrochloric acid | 5 | 120 | 8 | 17050 | 3.1 |
| Example 4 | 2-chloroethanol | 7 | 100 | 12 | 13969 | 3.4 |
| Comparative Example 1 | 2-chloroethanol | 5 | 90 | 8 | 17494 | 2.6 |
| Comparative Example 2 | Hydrochloric acid | 5 | 90 | 8 | 16621 | 2.0 |
| Comparative Example 3 | Sulfuric acid | 5 | 90 | 8 | 6300 | 1.5 |

It can be seen that it is possible to obtain a polymer which has a molecular weight to be equal to or slightly greater and a degree of dispersion to be slightly greater by increasing the polymerization temperature from the comparison between Example 1 and Comparative Example 1 and the comparison between Comparative Example 2 and Example 3. In addition, it is presumed that a polymer which has a higher molecular weight and a greater degree of dispersion is obtained by using a catalyst containing a halogen from the comparison between Comparative Example 2 and Comparative Example 3.

The invention claimed is:

1. An ethyleneimine polymer, wherein
a number average molecular weight (Mn) of the ethyleneimine polymer measured by gel permeation chromatography in terms of pullulan is 13,000 or more,
a degree of dispersion of the ethyleneimine polymer is 3.1 or more to 4.0 or less, and a water content in the ethyleneimine polymer is from 3 to 10% by weight.

2. A method for producing an ethyleneimine polymer, the method comprising:
polymerizing ethyleneimine under a temperature condition of higher than 90° C. and 150° C. or lower in the presence of water at from 1.0 to 40% by mass with respect to 100% by mass of the ethyleneimine and a catalyst at from 0.3 to 5% by mass with respect to 100% by mass of the ethyleneimine,
wherein a number average molecular weight (Mn) of the ethyleneimine polymer measured by gel permeation chromatography in terms of pullulan is 13,000 or more,
a degree of dispersion of the ethyleneimine polymer is 3.1 or more to 4.0 or less, and a water content in the ethyleneimine polymer is from 3 to 10% by weight.

3. The method for producing an ethyleneimine polymer according to claim 2, wherein
the catalyst is
a water-soluble organic compound having at least one halogen element and a hydrophilic substituent or
a water-soluble inorganic acid containing a halogen element.

4. The method for producing an ethyleneimine polymer according to claim 2, further comprising adjusting a water content after the polymerization.

5. The method for producing an ethyleneimine polymer according to claim 2, wherein a method for adding the catalyst is continuous addition.

6. An adhesion promoter for film printing ink comprising: the ethyleneimine polymer according to claim 1.

7. The ethyleneimine polymer according to claim 1, wherein the number average molecular weight (Mn) is 19,000 or more.

8. The ethyleneimine polymer according to claim 1, wherein the number average molecular weight (Mn) is 25,000 or more.

9. The ethyleneimine polymer according to claim 1, wherein the number average molecular weight (Mn) is 50,000 or less.

10. The ethyleneimine polymer according to claim 1, wherein the number average molecular weight (Mn) is 45,000 or less.

11. The ethyleneimine polymer according to claim 1, wherein the number average molecular weight (Mn) is 40,000 or less.

12. The ethyleneimine polymer according to claim 1, wherein the number average molecular weight (Mn) is 13,969 or more and the degree of dispersion is 3.4 or less.

13. The ethyleneimine polymer according to claim 1, wherein the water content is 4% by weight or more.

14. The ethyleneimine polymer according to claim 1, wherein the water content is 5% by weight or more.

* * * * *